United States Patent [19]

Sawyer et al.

[11] Patent Number: 5,608,978
[45] Date of Patent: Mar. 11, 1997

[54] DISPLAY CARD HOLDER

[75] Inventors: Thomas E. Sawyer; James E. Hoback, both of Valencia, Calif.

[73] Assignee: T.V. Fanfare Publications, Inc., Valencia, Calif.

[21] Appl. No.: 293,041

[22] Filed: Aug. 19, 1994

Related U.S. Application Data

[63] Continuation of Ser. No. 93,514, Jul. 19, 1993, Pat. No. 5,363,575, which is a continuation of Ser. No. 855,451, Mar. 19, 1992, abandoned, which is a continuation of Ser. No. 398,702, Aug. 25, 1989, abandoned, which is a continuation-in-part of Ser. No. 349,156, May 8, 1989, abandoned.

[51] Int. Cl.⁶ ................................................ G09F 3/00
[52] U.S. Cl. .................................... 40/308; 40/650
[58] Field of Search ........................... 40/308, 622, 642, 40/152, 152.1; 349/156

[56] References Cited

U.S. PATENT DOCUMENTS

| | | |
|---|---|---|
| 1,116,942 | 11/1914 | Smith . |
| 1,879,554 | 9/1932 | Simkins . |
| 2,111,780 | 3/1938 | Horton . |
| 2,361,479 | 10/1944 | Joffo . |
| 2,507,578 | 5/1950 | Schilperoort . |
| 3,024,554 | 3/1962 | Kempher ................................... 40/308 |
| 3,677,570 | 7/1972 | Hedu . |
| 3,956,841 | 5/1976 | Hensel . |
| 4,217,711 | 8/1980 | Spresser et al. .......................... 40/308 |
| 4,238,897 | 12/1980 | Byers ....................................... 40/650 |
| 4,475,300 | 10/1984 | Ledenican . |
| 4,518,080 | 5/1985 | Ohlson . |
| 4,765,074 | 8/1988 | Loos ......................................... 40/308 |
| 4,765,077 | 8/1988 | Rosenthal et al. ........................ 40/308 |
| 4,773,175 | 9/1988 | Larsen . |
| 4,805,331 | 2/1989 | Boggess et al. . |
| 5,306,033 | 4/1994 | Evans . |

FOREIGN PATENT DOCUMENTS

| | | |
|---|---|---|
| 543109 | 7/1957 | Canada . |
| 2440891 | 3/1976 | Germany . |
| 3502791 | 7/1986 | Germany . |
| 408628 | 9/1966 | Switzerland . |
| 23570 | 11/1899 | United Kingdom . |
| 202749 | 8/1923 | United Kingdom . |
| 1248451 | 7/1968 | United Kingdom . |
| 1511496 | 3/1975 | United Kingdom . |
| 2217504 | 10/1989 | United Kingdom . |

*Primary Examiner*—Laurie K. Cranmer
*Attorney, Agent, or Firm*—Loeb & Loeb LLP

[57] ABSTRACT

A display card holder which securely holds and displays a directory card or the like for use in connection with shopping baskets. The holder has a releasable outer frame member which clamps the card to a backing member.

20 Claims, 7 Drawing Sheets

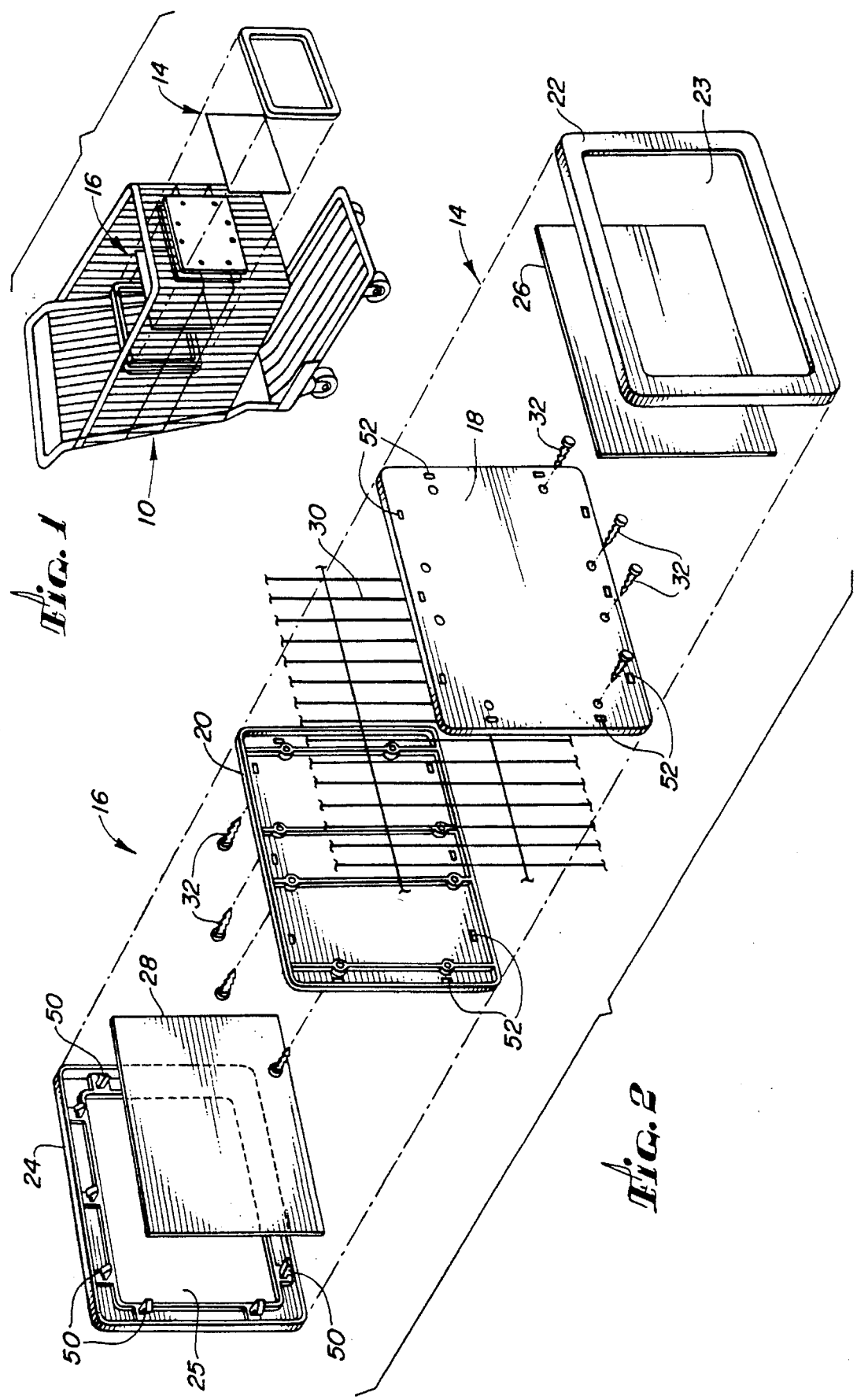

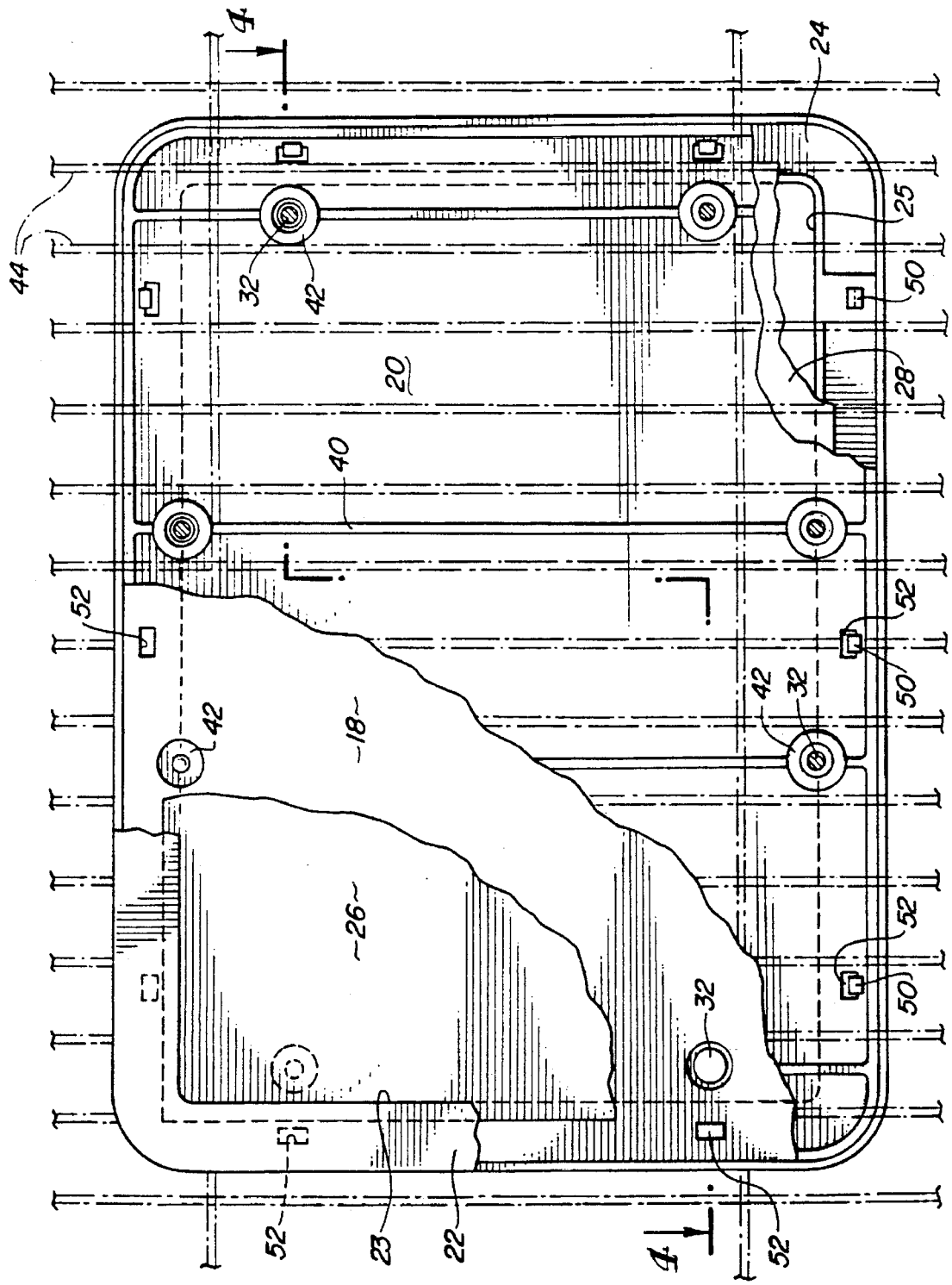

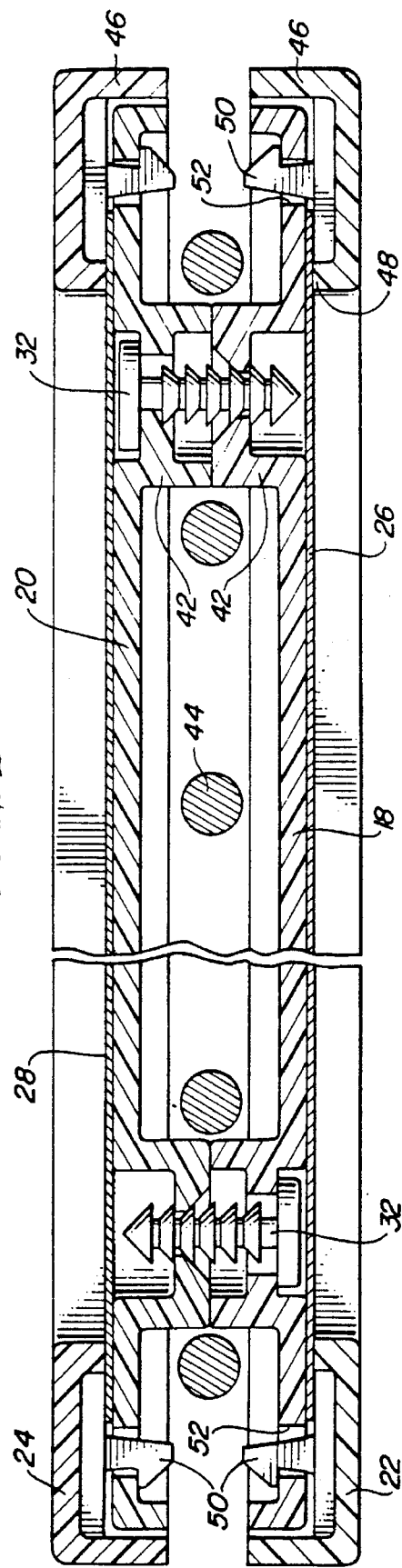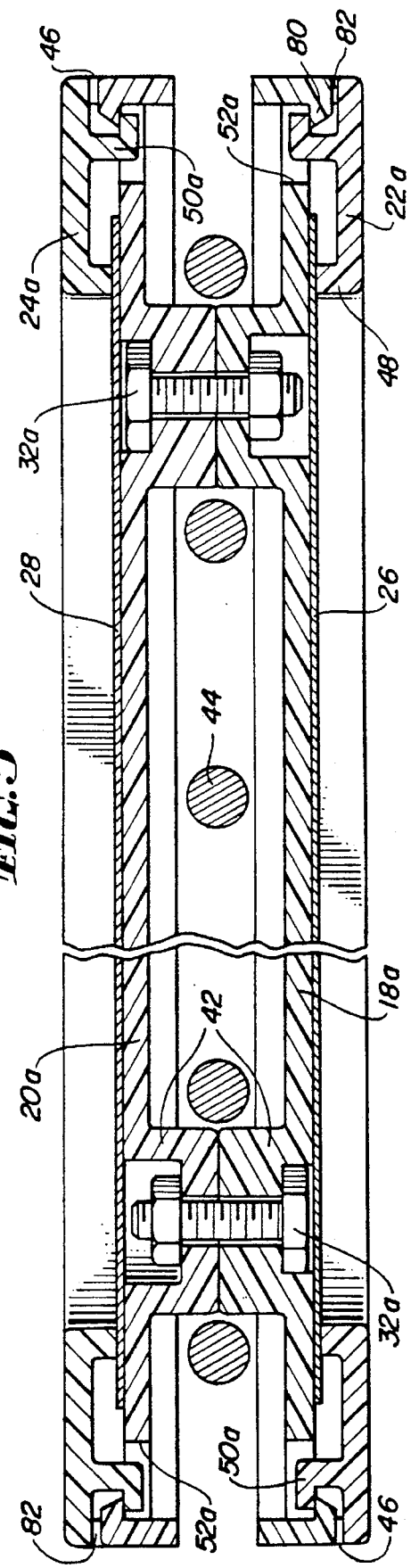

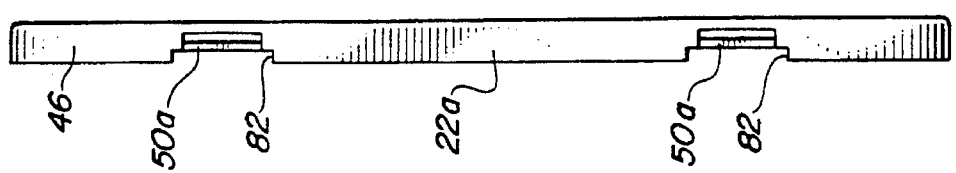
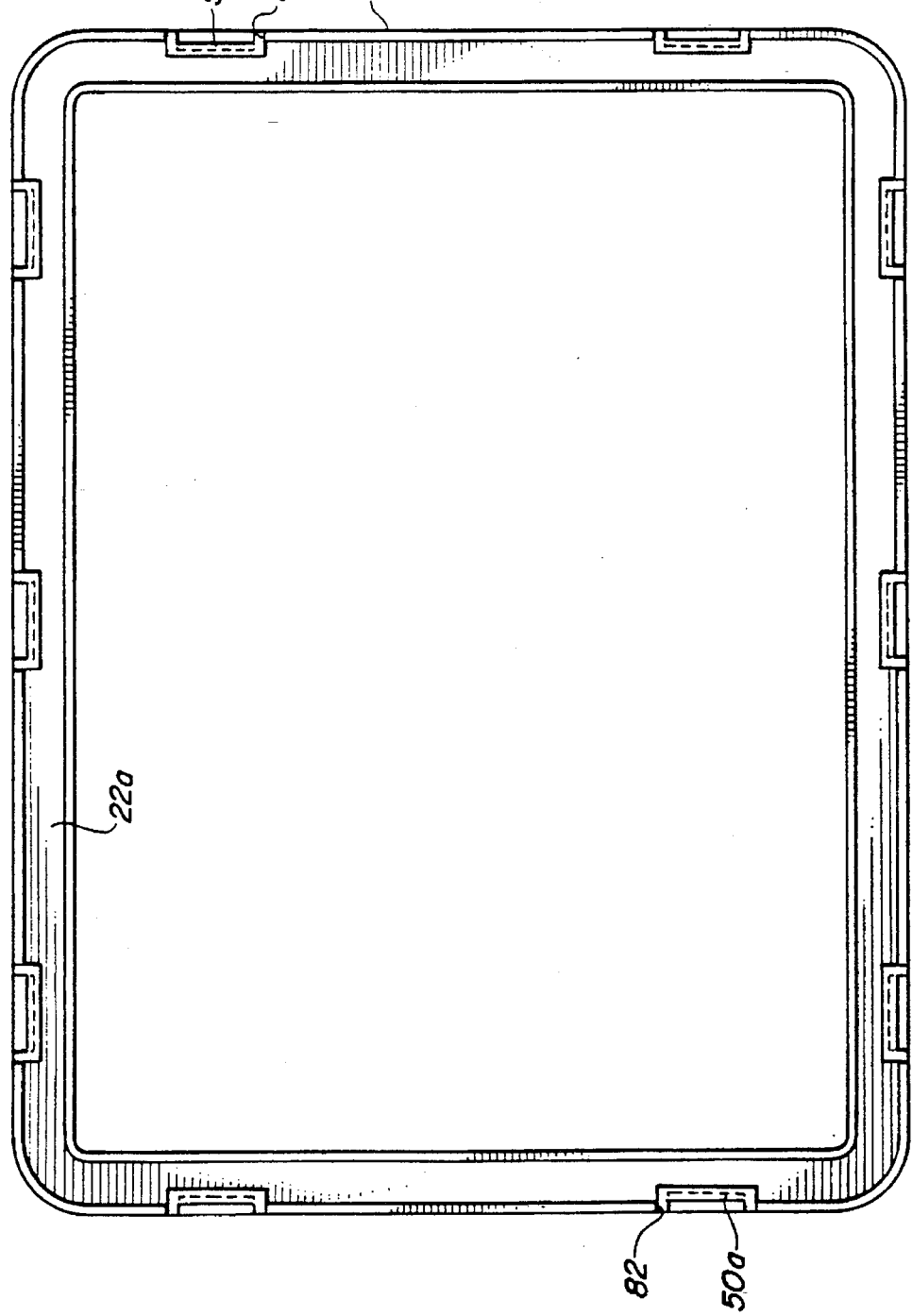

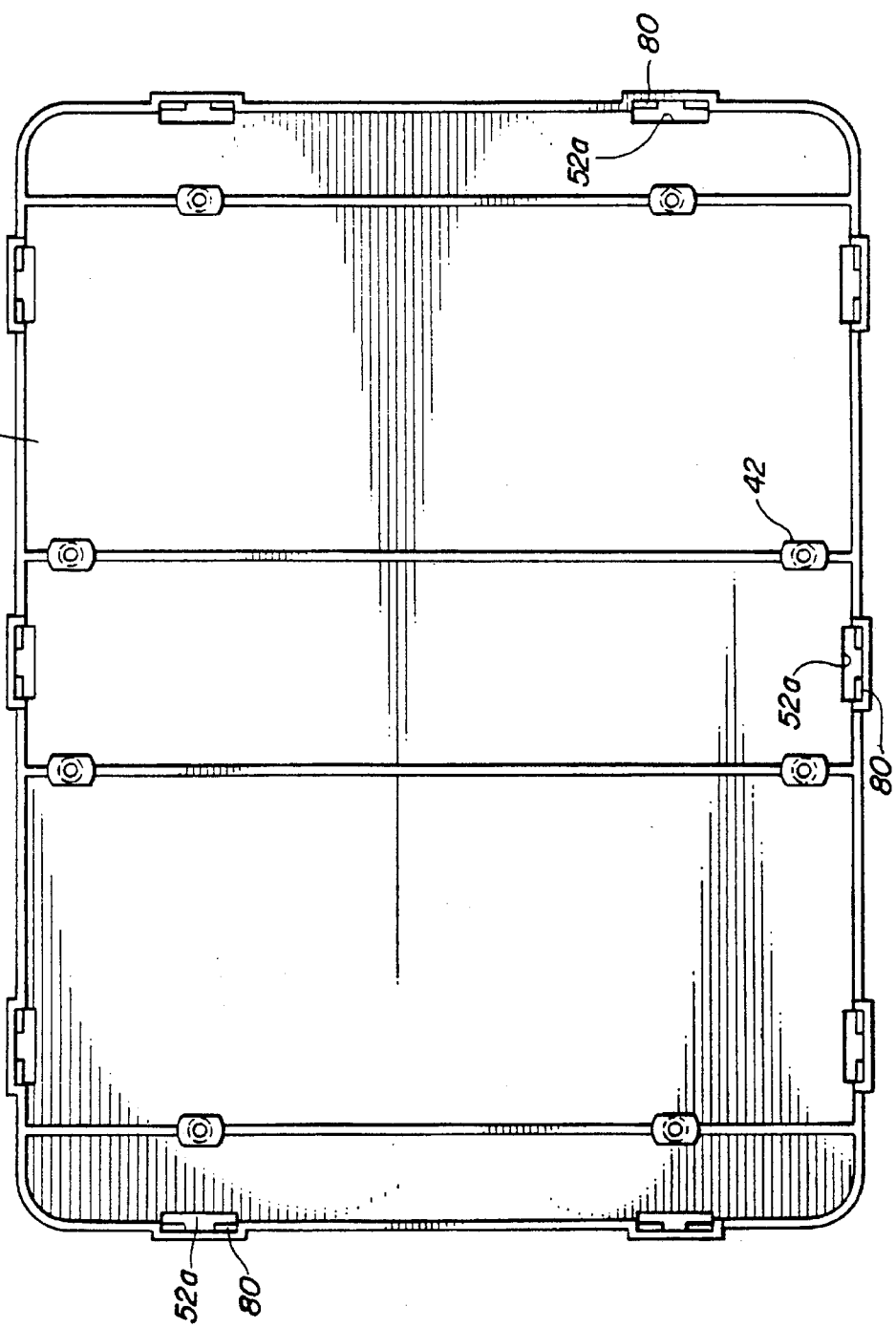

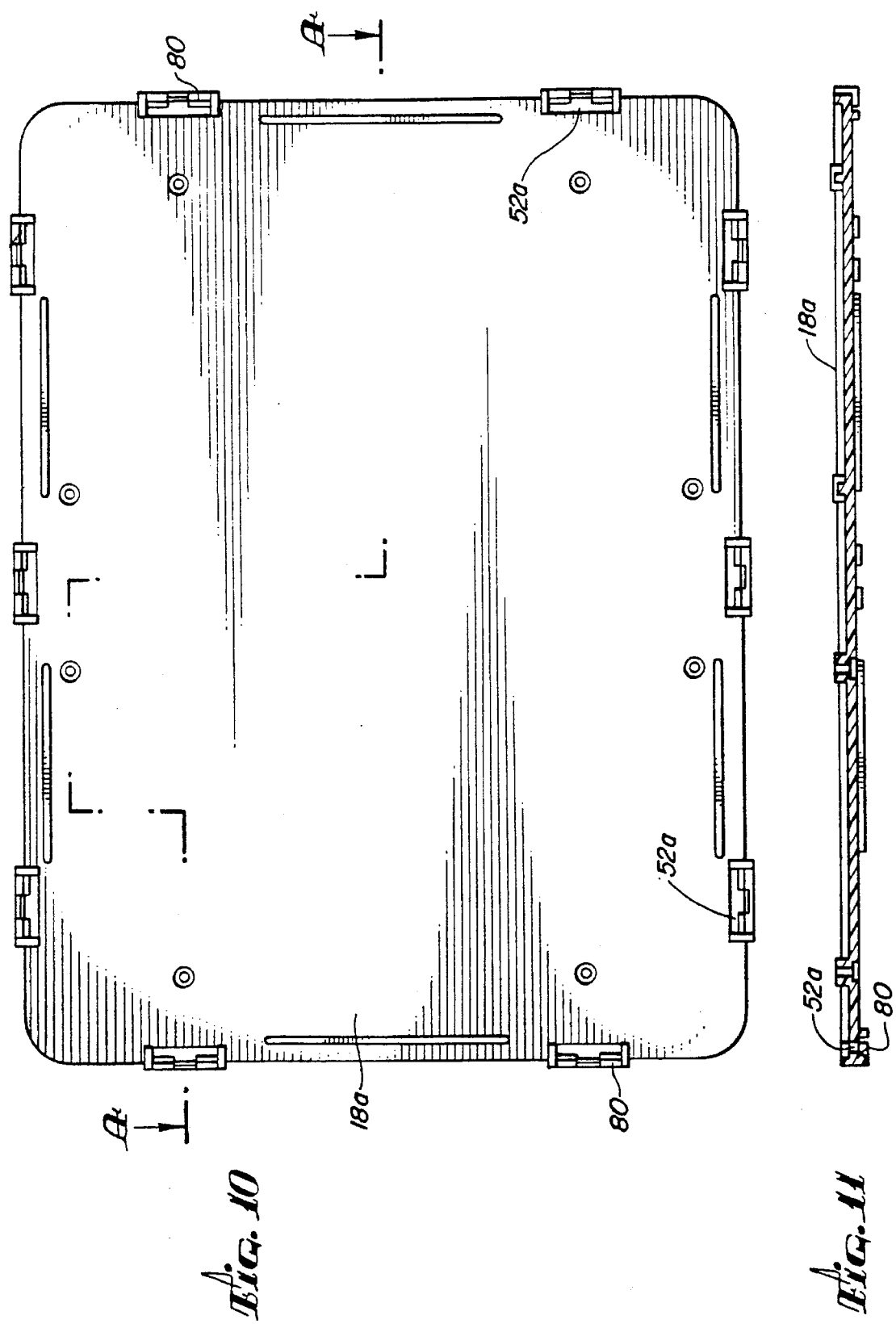

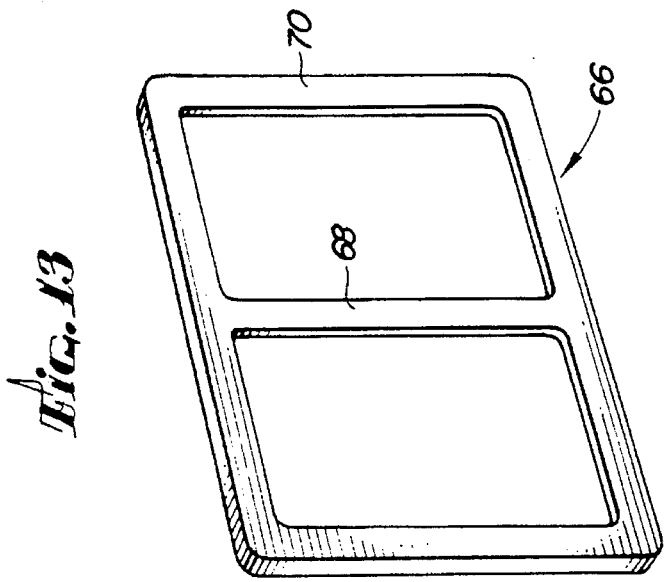
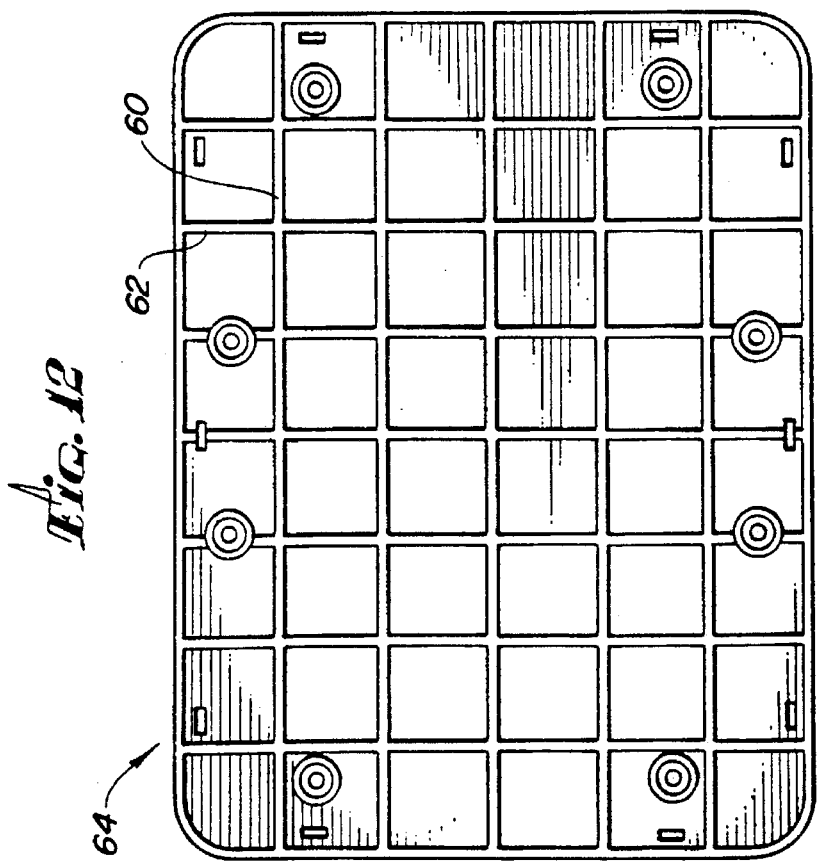

DISPLAY CARD HOLDER

This is a continuation application of application Ser. No. 08/093,514 filed on Jul. 19, 1993, now U.S. Pat. No. 5,363,575 which is a continuation of application Ser. No. 07/855,451, filed on Mar. 19, 1992, abandoned, which is a continuation of application Ser. No. 07/398,702, filed on Aug. 25, 1989, abandoned, which in turn is a continuation-in-part application of application Ser. No. 07/349,156, filed May 8, 1989, abandoned.

BACKGROUND OF THE INVENTION

1. Field of the Invention

The invention relates generally to a directory holder for use in combination with a shopping cart.

2. Description of Related Art

In general, large shopping centers and food markets typically have thousands of items of products stacked on shelves and arranged in aisles. These thousands of products are typically grouped together where they are essentially the same product but differ in brand or manufacturer. As is often the case, the department store or food store can assist the shopper by indicating in which aisles particular items may be found. For example, a shopping directory may be hung from a ceiling or placed in a stand at either end of an aisle. There are several problems associated with directories which must be hung from the ceiling over a particular area of the store or above a certain aisle. For example, in a very large store it is often difficult to see what is in a particular aisle or in a particular section of the store when one is located at the opposite end of the store. Also, because the printing on such directories must be large enough to be readable from a distance, fewer items can be listed on such a directory. Finally, if the store relocates a certain product, the directory will have to be changed or replaced.

U.S. Pat. No. 4,765,077 is directed to a directory holder which is mounted directly on a shopping cart. The directory holder of this reference allows directory and advertising placards or cards to be carried directly on the shopping cart for easy reference by a shopper. Moreover, the directory holder is designed so that the store owner can easily change the placard to substitute a revised directory or a new advertisement. In particular, the directory holder has a plurality of slots positioned to receive mating tabs of the placard. A raised periphery of the holder frame centers the placard and protects its edges. The placard is readily removed by flexing the placard sufficiently to withdraw the tabs from the frame slots.

However, for some applications, it may be desirable to hold the placard more securely without sacrificing the ability to easily change the placard. In addition, it may be desirable to more uniformly secure the periphery of the placard for a more uniform appearance.

SUMMARY OF THE INVENTION

It is an object of the present invention to provide an improved directory holder for a shopping cart, obviating, for practical purposes, the above mentioned limitations, particularly in manner requiring a relatively uncomplicated mechanical arrangement.

These and other objects and advantages are achieved in a directory holder which securely holds a directory or advertising placard in place yet allows the placard to be readily released. This is achieved by, in accordance with one aspect of the present invention, a directory holder having a backing member and a separate outer frame member which is releasably coupled to the backing member to hold the placard therebetween.

In the illustrated embodiment, the outer frame member clamps the periphery of the placard to the backing member. The clamping force is provided by a plurality of fasteners spaced about the periphery of the outer frame member. The fasteners are easily releasable to allow the placard to be readily changed. A second matching backing member, placard, and frame member assembly is mounted back to back with the first backing member, placard, and frame member assembly to the shopping cart with a wall of the shopping cart therebetween.

BRIEF DESCRIPTION OF THE DRAWINGS

FIG. 1 is an exploded perspective view of a typical shopping cart illustrating directory holders in accordance with a preferred embodiment of the present invention and directories as they would be mounted on the wire supports of the shopping carts.

FIG. 2 is a detailed exploded perspective view of the various components of one embodiment of the directory holder of the present invention.

FIG. 3 is a front view of the directory holder of FIG. 2 with a portion broken away.

FIG. 4 is a sectional view taken along line 4—4 in FIG. 3.

FIG. 5 is a sectional view similar to FIG. 4 showing an alternative embodiment of the directory holder.

FIG. 6 is a back view of the outer frame member of the directory holder shown in FIG. 5.

FIG. 7 is a side view of the outer frame member of FIG. 6.

FIG. 8 is a back view of the backing member of the directory holder shown in FIG. 5.

FIG. 9 is a side view of the backing member of FIG. 8.

FIG. 10 is a front view of the backing member of FIG. 8.

FIG. 11 is a cross sectional view taken along line A—A in FIG. 10.

FIG. 12 is a back view of the back plate of another embodiment of the directory holder of the present invention.

FIG. 13 is a perspective view of the outer frame of yet another embodiment of the directory holder of the present invention.

DESCRIPTION OF THE ILLUSTRATED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

FIG. 1 shows a typical shopping cart 10 which is used by shoppers in supermarkets. The shopping cart 10 has a wire basket 12 for holding items removed from the shelves in the supermarkets. Shown in FIG. 1 are two directory holders 14 and 16 mounted back to back on the wire basket 12. The wall of the wire basket is sandwiched between the two directory holders, one of which faces inward and the other of which faces outward of the wire basket.

Referring to FIG. 2, the assembly of the directory holders 14 and 16 on the wire basket is more clearly shown. Each directory is substantially made up of two sections, a backing member or plate (18, 20) and an outer frame (22, 24). The backing plate is substantially planar. The outer frame (22, 24) resembles an annular rectangular ring defining a central display window (23, 25). The two sections may be made of any suitable material, preferably plastic, such as polyethylene or more preferably polypropylene. A directory or advertising placard (26, 28) is sandwiched between the backing plate (18, 20) and the outer frame (22, 24) through which the directory information is displayed.

The backing plate 18 of one of the directory holders 14 is placed against the outside of the section 30 of the wire basket and the backing plate 20 of the other directory holder 16 is placed against the inside of the section 30 of the wire basket such that the backing plates 18 and 20 are on either side of the wire basket section 30. The backing plates 18 and 20 are secured together using a number of fasteners 32 around the perimeter of the backing plates 18 and 20. In the embodiment illustrated in FIG. 4, the fasteners 32 used are of the barbed typed which are easily assembled. Alternatively, screws, bolts and nuts (as shown in the embodiment illustrated in FIG. 5), or any other suitable fastener known to those skilled in the art may be used to fasten the backing plates 18 and 20 together. As will be described in greater detail below in reference to FIG. 4, the backing plates of the directory holder contact one another at least at the locations where the fasteners are applied.

Referring to FIG. 3, the fully assembled directory holders are illustrated. The directory card 26 is sized a little larger than the display window 23 of the outer frame 22 such that the periphery of the card 26 is clamped between the backing plate 18 and the outer frame 22. The rear surface of the backing plate 18 is provided with longitudinal ribs (as is shown by ribs 40 on the rear of similar backing plate 20) to increase the stiffness and rigidity of the backing plate. Also provided on the rear surface of the backing plate 18 are pads 42. Each pad is provided with a hole for a fastener 32. The pads 42 are spaced across the rear surface and sized in such a manner that they will fit between adjacent wires 44 of the wire basket.

FIG. 4 is a sectional view showing the various "layers" of the directory holders. The outer frame 22 has an outer rim 46 or lip that extends over the periphery of the backing plate 18 and an inner rim 48 that presses on the directory card 26. As shown in FIGS. 2–4, the outer frame has several hooks 50 around the perimeter of the frame which extend perpendicular to the plane of the frame. Holes 52 are provided around the perimeter of the backing plate 18, which are adapted to receive the hook 50 to form a latch coupling. The length of each hook 50 is chosen such that when the hook is latched onto the backing plate 18, the inner rim 48 of the outer frame presses the directory card 26 against the backing plate 18 thereby to clamp the periphery of the directory card 26 between the backing plate 18 and the outer frame 22. Directory holder 20 has the same arrangement.

FIGS. 5–11 show an alternative and preferred embodiment of the directory holder having a slightly different structure for attaching the outer frame to the backing plate. In this embodiment, the backing plate 18a is provided with hooks 80. The hooks 80 are spaced around the perimeter of the backing plate 18a in a manner similar to that of the hooks 50 of the frame 22 of FIG. 4, and extend from the backing plate in the general plane of the backing plate. Associated with each hook is a hole 52a defined within the backing plate 18a for receiving hook 50a of outer frame 22a when the outer frame 22a is pressed against the backing plate. The hooks 80 are oriented such that they engage with hooks 50a thereby releasably coupling the outer frame to the backing plate to clamp the directory card 26 firmly therebetween. The outer lip 46 of the outer frame 22a is provided with recesses 82 to accommodate the hooks 80 when the outer frame is engaged with the backing plate. In this manner, the hooks 80 and 50a are readily accessible and the outer frame can be quickly and easily released from the backing plate by moving the hooks 80 and 50a so that they disengage one another.

The height of the pads 42 are chosen such that the backing plates 18 and 20 are spaced on either side of the rows of wires and the backing plates. The height of the pads may be chosen such that backing plates touch the wires 44 so as to clamp the wires 44 between the two backing plates 18 and 20. As illustrated in FIG. 5, fasteners 32a are threaded bolts which engage with threaded nuts to fasten backing plates 18a and 20a together.

FIG. 12 shows another embodiment of the backing plate. Horizontal and vertical ribs 60 and 62 are provided on the rear surface of the backing plate 64 in a "waffle" configuration. This arrangement provides additional support to improve stiffness and rigidity of the backing plate.

FIG. 13 shows another embodiment of the outer frame of the directory holder. The outer frame 66 defines two display windows. Hooks (not visible) for latching onto the backing plate may be provided along the middle section 68 of the frame as well as the outer section 70. This embodiment provides for two display sections. With this embodiment, two smaller display cards may be used to display different categories of goods. When updating one of the categories, only one of the cards need be changed.

While the invention has been described with respect to the preferred embodiments in accordance therewith, it will be apparent to those skilled in the art that various modifications and improvements may be made without departing from the scope and spirit of the invention. For example, although the present invention is described with reference to a shopping cart, the present invention can be applied to shopping baskets or other types of containers for the same display purpose. The directory holder may be attached to any part of the wire basket of the shopping cart, e.g., to the smaller basket in which a small child may ride. The outer frame may be subdivided into any number of display sections of different sizes to suit the particular display task desired. Instead of using two back to back directory holders, a single directory holder may be attached to the wire basket of a shopping cart facing either outward or inward of the shopping cart. The backing plate of the directory holder may be perforated to reduce material and weight. A transparent cover sheet may be placed between the directory card and the outer frame to provide a protective cover for the directory card. Accordingly, it is to be understood that the invention is not to be limited by the specific illustrated embodiments, but only by the scope of the appended claims.

What is claimed is:

1. A display card holder for receiving a display card for use in combination with a shopping cart, the display card holder comprising:

a first backing member;

coupling means for coupling said first backing member to the cart;

a first outer frame member having a periphery of substantially the same size and shape of at least a portion of the periphery of the first backing member; and a first plurality of fasteners independent of the coupling means, for releasably fastening the first outer frame member to the first backing member, each fastener comprising a first hook carried by the first outer frame member, said fastener further comprising a second hook carried by the first backing member and positioned to be engaged by the first hook so as to fasten the first outer frame member and the first backing member together and to effect clamping a card at its periphery between the first outer frame and the first backing member, wherein at least one of said first and second hooks is movable to disengage the other hook so as to allow the first outer frame member to be released from the first backing member.

2. A display card holder as in claim 1 wherein the first backing member and the first outer frame member are generally rectangular and the first outer frame member defines a window of sufficient size to display a substantial portion of the card.

3. A display card holder as in claim 1 wherein the first outer frame member has a lip adapted to overhang and cover at least a portion of the side of the first backing member.

4. A display card holder as in claim 1 wherein the first outer frame has an inner rim adapted to directly engage the card to clamp the card against the first backing member.

5. A display card holder as in claim 1, wherein the first outer frame defines therein a plurality of first access openings and wherein at least one of said first and second hooks is movable by means of access provided at an associated one of the first access openings.

6. A display card holder for receiving a display card for use in combination with a shopping cart, the display card holder, comprising:

a first backing member;

coupling means for coupling said first backing member to the cart;

a first outer frame member having a periphery of substantially the same size and shape of at least a portion of the periphery of the first backing member;

a first plurality of fasteners independent of the coupling means, for releasably fastening the first outer frame member to the first backing member, each of the first plurality of fasteners having a first hook carried by the first outer frame member, each of the first plurality of fasteners further having a second hook carried by the first backing member and positioned to be engaged by the first hook so as to fasten the first outer frame member and the first backing member together and to effect clamping a card at its periphery between the first outer frame and the first backing member, wherein at least one of said first and second hooks is movable to disengage the other hook so as to allow the first outer frame member to be released from the first backing member;

a second backing member;

a second outer frame member;

a second plurality of fasteners for releasably coupling the second outer frame member to the second backing member; and a third plurality of fasteners for coupling the first and second backing member together with a wall of the cart therebetween, wherein the second outer frame defines therein a plurality of access openings and wherein said second plurality of fasteners may be released by means of access provided at said access openings.

7. A display card holder for receiving a display card for use in combination with a shopping cart, the display card holder comprising:

a first backing member;

coupling means for coupling said first backing member to the cart;

a first outer frame member having a periphery of substantially the same size and shape of at least a potion of the periphery of the first backing member;

a first plurality of fasteners independent of the coupling means, for releasably fastening the first outer frame member to the first backing member, each of the first plurality of fasteners having a first hook carried by the first outer frame member, each of the first plurality of fastener further having a second hook carried by the first backing member and positioned to be engaged by the first hook so as to fasten the first outer frame member and the first backing member together and to effect clamping a card at its periphery between the first outer frame and the first backing member, wherein at least one of said first and second hooks is movable to disengage the other hook so as to allow the first outer frame member to be released from the first backing member;

a second backing member;

a second outer frame member;

a second plurality of fasteners for releasably coupling the second outer frame member to the second backing member; and a third plurality of fasteners for coupling the first and second backing member together with a wall of the cart therebetween, wherein each of the second plurality of fasteners has a third hook and a fourth hook carried by the second backing member and the second outer frame member, respectively, for clamping a card at its periphery between the second outer frame member and the second backing member when the third and the fourth hooks engage with each other.

8. A display card holder as in claim 7, wherein the second outer frame defines therein a plurality of second access openings and wherein at least one of said third and fourth hooks is movable by means of access provided at an associated one of the second access openings to disengage the other hook so as to allow the second outer frame member to be released from the second backing member.

9. A display card holder for receiving a display card for use in combination with a shopping cart, the display card holder comprising:

a first backing member to be coupled to the cart;

a first outer frame member adapted to be coupled to the first backing member and defining therein a plurality of first access openings; and a first plurality of fasteners provided inside the first outer frame for releasably fastening the first outer frame member to the first backing member, wherein the fasteners may be released by means of access provided at the first access openings.

10. A display card holder as in claim 9 further comprising a coupling device for coupling the first backing member to the basket, and wherein the first plurality of fasteners are independent of the coupling device.

11. A display card holder as in claim 9, wherein the first plurality of fasteners releasably fasten the first outer frame member to the first backing member and effect clamping a card at its periphery between the first outer frame and the first backing member.

12. A display card holder as in claim 9, wherein each of the first plurality of fasteners comprises a first hook carried by the first outer frame member and a second hook carried by the first backing member and positioned to be engaged by the first hook, and wherein at least one of said first and second hooks is movable to disengage the other hook so as to allow the first outer frame member to be released from the first backing member.

13. A display card holder as in claim 12, wherein at least one of said first and second hooks is movable by means of access provided at an associated one of the first access openings.

14. A display card holder as in claim 9 further comprising:
 a second backing member;
 a second outer frame member;
 a second plurality of fasteners for releasably coupling the second outer frame member to the second backing member; and
 a third plurality of fasteners for coupling the first and second backing members together with a wall of the cart therebetween.

15. A display card holder as in claim 9, wherein the first backing member and the first outer frame member are generally rectangular and the first outer frame member defines a window of sufficient size to display a substantial portion of the card.

16. A display card holder as in claim 9, wherein the first backing member has a lip adapted to overhand and cover at least a portion of the side of the first backing member.

17. A display card holder as in claim 9, wherein the first outer frame has an inner rim adapted to directly engage the card to clamp the card against the first backing member.

18. A display card holder for receiving a display card for use in combination with a shopping cart, the display card holder comprising:
 a first backing member to be coupled to the cart;
 a first outer frame member adapted to be coupled to the first backing member and defining therein a plurality of first access openings;
 a first plurality of fasteners for releasably fastening the first outer frame member to the first backing member, wherein the fasteners may be released by means of access provided at the first access openings;
 each of the first plurality of fasteners having a first hook carried by the first outer frame member and a second hook carried by the first backing member and positioned to be engaged by the first hook, and at least one of said first and second hooks being movable to disengage the other hook so as to allow the first outer frame member to be released from the first backing member;
 at least one of said first and second hooks being movable by means of access provided at an associated one of the first access openings;
 wherein the second outer frame defines therein a plurality of second access openings and wherein said second plurality of fasteners may be released by means of access provided at the first access openings.

19. A display card holder as in claim 18, wherein the second outer frame defines therein a plurality of second access openings and wherein at least one of said third and fourth hooks is movable by means of access provided at an associated one of the second access openings to disengage the other hook so as to allow the second outer frame member to be released from the second backing member.

20. A display card holder for receiving a display for use in combination with a shopping cart, the display card holder comprising:
 a first backing member to be coupled to the cart;
 a first outer frame member adapted to be coupled to the first backing member and defining therein a plurality of first access openings;
 a first plurality of fasteners for releasably fastening the first outer frame member to the first backing member, wherein the fasteners may be released by means of access provided at the first access openings;
 a second backing member;
 a second outer frame member;
 a second plurality of fasteners for releasably coupling the second outer frame member to the second backing member; and
 a third plurality of fasteners for coupling the first and second backing members together with a wall of the cart therebetween;
 wherein each of the second plurality of fasteners has a third hook and a fourth hook carried by the second backing member and the second outer frame member, respectively, for clamping a card at its periphery between the second outer frame member and the second backing member when the third and the fourth hooks engage with each other.

* * * * *